US008649827B2

(12) United States Patent
Su

(10) Patent No.: US 8,649,827 B2
(45) Date of Patent: Feb. 11, 2014

(54) POWER SUPPLY UNIT FOR MOBILE TERMINAL AND POWER SUPPLY SWITCHING METHOD FOR MOBILE TERMINAL

(75) Inventor: Haibo Su, Huizhou (CN)

(73) Assignee: Huizhou TCL Mobile Communications Co., Ltd, Huizhou, Guangdong (CN)

( * ) Notice: Subject to any disclaimer, the term of this patent is extended or adjusted under 35 U.S.C. 154(b) by 310 days.

(21) Appl. No.: 13/203,954

(22) PCT Filed: Jun. 25, 2010

(86) PCT No.: PCT/CN2010/074500
§ 371 (c)(1),
(2), (4) Date: Aug. 30, 2011

(87) PCT Pub. No.: WO2011/029334
PCT Pub. Date: Mar. 17, 2011

(65) Prior Publication Data
US 2011/0319143 A1    Dec. 29, 2011

(30) Foreign Application Priority Data
Sep. 10, 2009  (CN) .................... 2009 1 0190026 6

(51) Int. Cl.
*H04M 1/00* (2006.01)
(52) U.S. Cl.
USPC ............................ 455/573; 455/274; 455/557
(58) Field of Classification Search
USPC .......................................................... 455/573
See application file for complete search history.

(56) References Cited

U.S. PATENT DOCUMENTS

| 7,221,961 | B1 * | 5/2007 | Fukumoto et al. | 455/557 |
| 2007/0060092 | A1 * | 3/2007 | Laiho et al. | 455/274 |
| 2007/0092763 | A1 | 4/2007 | Ouchi | |
| 2010/0211921 | A1 * | 8/2010 | Hu et al. | 716/5 |
| 2011/0051476 | A1 * | 3/2011 | Manor et al. | 363/65 |

FOREIGN PATENT DOCUMENTS

CN    1596501 A    3/2005

\* cited by examiner

*Primary Examiner* — Ajibola Akinyemi
(74) *Attorney, Agent, or Firm* — Shimokaji & Associates P.C.

(57) ABSTRACT

The present invention discloses a power supply unit and a power supply switching method for mobile terminals. The terminal power supply unit comprises a battery, a power supply conversion module, a charging management module and a power supply switching module; the charging management module and the power supply switching module both comprise a power supply input port used for connection with an external power supply; the charging management module is connected with the battery and used for charging the battery when an external power supply is connected; the power supply conversion module is connected with the power supply switching module and used for converting the voltage of an external power supply into a power supply voltage required by the terminal and controlling an on-off state of the power supply switching module such that the power supply switching module is in an on state when no external power supply is connected, the battery supplies power to the terminal, and such that the power supply switching module is off and the power supply conversion module outputs the power supply voltage when an external power supply is connected. The present invention realizes that when the terminal is connected with an external power supply, the external power supply supplies power to the terminal and the battery is only charged without supplying power to the terminal, which is suitable for power supply switching of existing handsets and 3G handsets.

16 Claims, 3 Drawing Sheets

POWER SUPPLY UNIT FOR MOBILE TERMINAL AND POWER SUPPLY SWITCHING METHOD FOR MOBILE TERMINAL

FIELD OF THE INVENTION

The present invention relates to the field of electronic technology, and more specifically, to a power supply unit and a power supply switching method for mobile terminals.

DESCRIPTION OF THE RELATED ART

In today's social life, cell phones have become an indispensable communications tool and have brought tremendous convenience to life. Conventional cell phones are typically powered with batteries. When a cell phone is charged by an external power supply, the cell phone battery still supplies power to the cell phone While being charged, which shortens the service life of the battery and increases the cell phone's peripheral cost. In addition, it is not compliant with the requirement in the "Chinese Standards for Mobile TD Family Cell Phones" that, with an external power supply, the power supply charges the terminal, and the battery is only charged without supplying power to the terminal.

Therefore, the prior art is to be improved.

SUMMARY OF THE INVENTION

An object of the present invention is to provide a power supply unit and a power supply switching method for mobile terminals, such that when an external power supply charges the terminal, the terminal can be powered by the power supply, and the battery is only charged without supplying power to the terminal.

In order to attain the above object, the present invention employs the following technical solution:

A power supply unit for mobile terminals comprises a power supply conversion module; a charging management module; and a power supply switching module; wherein the charging management module and power supply switching module each comprise a power supply input port used for connection with an external power supply; the charging management module is connected with a battery and used for charging the battery when the external power supply is connected; the power supply conversion module is connected with the power supply switching module and used for converting a voltage of an external power supply into power supply voltage required by the mobile terminal and controlling an on-off state of the power supply switching module, wherein the power supply switching module is in an on state when no external power supply is connected and the battery supplies power to the mobile terminal, and wherein the power supply switching module is off and the power supply conversion module outputs the power supply voltage when the external power supply is connected.

The power supply unit for mobile terminals further comprises a system power supply module, the system power supply module being connected in parallel at an output of the power supply conversion module and used for charging and power storage during off time of radio frequency transmission of a mobile terminal and for discharging during radio frequency transmission of the mobile terminal.

The power supply unit for mobile terminals and its power supply conversion module further comprises an integrated chip with model number POWER-DC20C-TPS62040DRC used for converting the voltage of an external power supply into a power supply voltage required by a mobile terminal.

The power supply unit for mobile terminals wherein its power supply switching module further comprises a second resistor, a third resistor; and a field effect transistor; the second resistor and third resistor are connected in series to form a voltage sampling circuit; one end of the third resistor is connected with the power supply conversion module; a voltage dividing point of the voltage sampling circuit is connected with a gate of the field effect transistor; and a source of the field effect transistor is connected with the battery.

The power supply unit for mobile terminals has a sum of resistance of the second resistor and third resistor of 1.2 KΩ~1.5 KΩ.

The power supply unit for mobile terminals has its system power supply module with a first capacitor and a second capacitor connected in parallel.

The power supply unit for mobile terminals has the first capacitor and second capacitor as tantalum capacitors.

A power supply switching method comprises detecting whether a mobile terminal is in a first mode of operation, wherein an external power supply is connected to the mobile terminal, or whether the mobile terminal is in a second mode of operation, wherein the external power supply is not connected to the mobile terminal; supplying power to the mobile terminal with a battery when the mobile terminal is in the second mode of operation; and supplying power to the mobile terminal and charging the battery with the external power supply when the mobile terminal is in the first mode of operation, wherein, in the first mode of operation, the battery does not supply power to the mobile terminal.

The method described above further comprises activating a system power supply module to discharge and supplement the external power supply to the mobile terminal when the mobile terminal is in a first mode of operation.

The method described above further comprises converting a voltage of the external power supply into a power supply voltage required by a mobile terminal.

The method described above wherein the power supply switching module comprises a second resistor, a third resistor and a field effect transistor; said second resistor and third resistor are connected in series to form a voltage sampling circuit; one end of the third resistor is connected with the power supply conversion module; a voltage dividing point of the voltage sampling circuit is connected with a gate of the field effect transistor; and a source of the field effect transistor is connected with the battery.

The method described above wherein a sum of resistance of said second resistor and third resistor is 1.2 KΩ~1.5 KΩ.

A mobile terminal comprises a battery; a power supply input port for connecting an external power supply; a power supply conversion module adapted to receive power via the power supply input port; a charging management module adapted to receive power via the power supply input port; and a power supply switching module; wherein the charging management module is connected with the battery and is used for charging the battery when the external power supply is connected to the power supply input port; and the power supply conversion module is connected with the power supply switching module and is used for converting a voltage of the external power supply into power supply voltage required by the mobile terminal and for controlling an on-off state of the power supply switching module; wherein the power supply switching module is in an on state when no external power supply is connected and the battery supplies power to the mobile terminal; and wherein the power supply switching module is off and the power supply conversion module outputs the power supply voltage when the external power supply is connected.

The mobile terminal further comprises a system power supply module; the system power supply module is connected in parallel at an output of the power supply conversion module and used for charging and power storage during off time of radio frequency transmission of a mobile terminal and for discharging during radio frequency transmission of the mobile terminal.

The mobile terminal described above, wherein the power supply conversion module comprises an integrated chip with model number POWER-DC20C-TPS62040DRC used for converting the voltage of an external power supply into a power supply voltage required by a mobile terminal.

The mobile terminal described above, wherein the power supply switching module comprises a second resistor, a third resistor and a field effect transistor; the second resistor and third resistor are connected in series to form a voltage sampling circuit; one end of the third resistor is connected with the power supply conversion module; a voltage dividing point of the voltage sampling circuit is connected with a gate of the field effect transistor; and a source of the field effect transistor is connected with the battery.

The mobile terminal described above, wherein a sum of resistance of the second resistor and third resistor is 1.2 KΩ~1.5 KΩ.

The mobile terminal described above, wherein the system power supply module comprises a first capacitor and a second capacitor connected in parallel.

The mobile terminal described above, wherein the first capacitor and second capacitor are both tantalum capacitors.

DETAILED DESCRIPTION OF THE INVENTION

To make the object, technical solution and advantages of the present invention clearer and more specific, the present invention is further described in detail below with reference to the accompanying drawings and embodiments.

Figure 1:
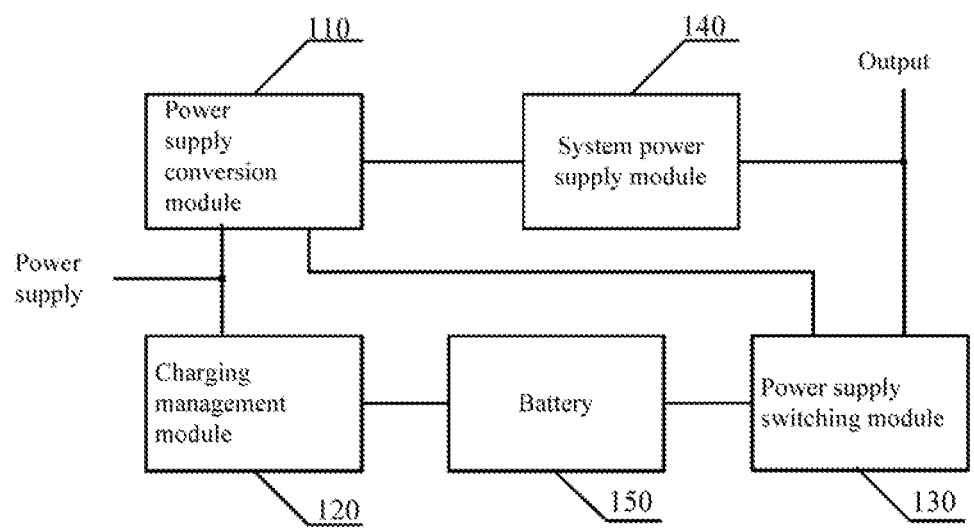
FIG. 1 is a block diagram of a power supply unit for mobile terminals according to the present invention.

As required by the "Chinese Standards for Mobile TD Family Cell Phones," with an external power supply, the power supply charges the terminal, and the battery is only charged without supplying power to the terminal. In order to satisfy the above requirement, the present invention provides a power supply unit for mobile terminals as shown in FIG. 1 and FIG. 2

The present invention comprises a power supply conversion module 110, a charging management module 120, a power supply switching module 130, a system power supply module 140 and a battery 150. The battery 150 is used for supplying power to the mobile terminal, the charging management module 120 and power supply switching module 110 both comprise a power supply input port used for connection with an external power supply (5 V direct current (DC) power supply input from a charger or a computer USB interface). The charging management module 120 is connected with the battery 150 and used for charging the battery 150 when an external power supply is connected to the mobile terminal. The power supply conversion module 110 is connected with the power supply switching module 130 and used for converting the voltage of an external power supply into power supply voltage required by the terminal and controlling on-off state of the power supply switching module 130. When no external power supply is connected to the mobile terminal, the power supply conversion module 110 sets the power supply switching module 130 to an on state, and the battery supplies power to the mobile terminal; when an external power supply is connected to the mobile terminal, the power supply conversion module 110 cuts off the power supply switching module 130, and the power supply conversion module outputs the power supply voltage.

Figure 2:
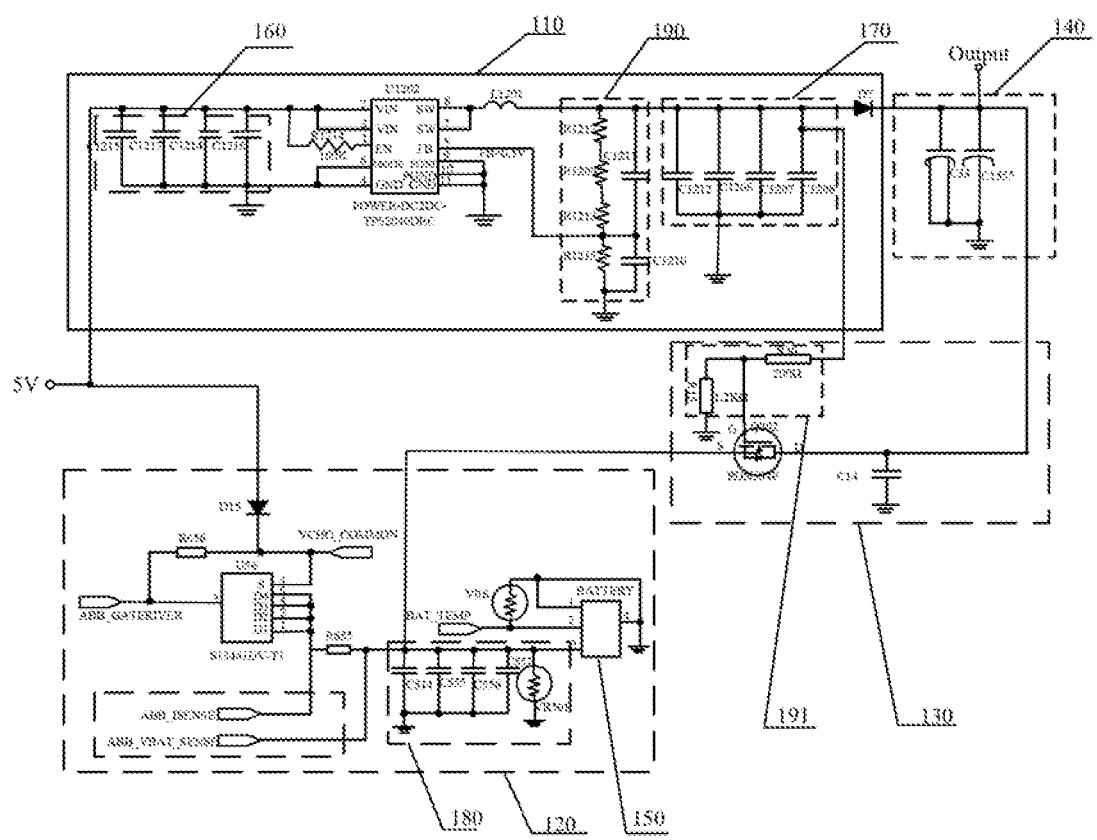
FIG. 2 is a circuit diagram of an embodiment of a power supply unit for mobile terminals according to the present invention.

As shown in FIG. 2, the power supply conversion module 110 comprises an integrated chip U1202 for converting the voltage of an external power supply into a power supply voltage required by a mobile terminal, the integrated chip U1202 has a model number POWER-DC20C-TPS62040DRC. A 5 V DC power supply is input from pins 1, 2, 3, 4, and 6 of the chip U1202, the chip U1202 converts the 5 V DC voltage to a 4.2 V voltage required by a mobile terminal, which is then output from pins 5, 7 and 8 of the chip U1202.

Pin 1 of the chip U1202 is connected with a first resistor R1214 in series and then connected with the input port of the power supply, input ports of pins 4 and 6 of the chip are connected with a first filter circuit 160 and then connected with the input port of the power supply, and pins 2 and 3 of the chip are directly connected with the input port of the power supply. Pin 5 of the chip is connected with a voltage dividing point of a first voltage sampling circuit 190, one end of the first voltage sampling circuit is connected with the output port of the power supply unit for mobile terminals, and the other end thereof is grounded. Pins 9, 10, and 11 of the chip U1202 are grounded, pin 7 of the chip U1202 is connected with the chip's pin 8, and the output port of pin 8 of the chip is connected with an inductor L1201 in series and then connected with the output port of the power supply unit for mobile terminals.

A second filter 170 is further connected to the output port of the power supply conversion module 110. Signal output of the second filter circuit 170 is connected with the output port of the power supply unit for mobile terminals via a first diode D7.

As shown in FIG. 2, in the present embodiment, the first filter circuit 160 and the second filter circuit 170 are comprises of at least two capacitors connected in parallel. In the power supply unit for mobile terminals provided by the present invention, there is no limit on the number of capacitors used in the first filter circuit 160 and the second filter circuit 170, for example, four capacitors can be connected in parallel. The first voltage sampling circuit 190 includes at least two resistors in series. In the power supply unit for mobile terminals provided by the present invention, however, there is no limit on the number of resistors in series. For example, three resistors can be connected in series and then connected with a fourth resistor R1215 in series with the connection point being a voltage dividing point. When an external power supply has an input voltage of 5 V, the voltage output at the voltage dividing point of the first voltage sampling circuit 190 is 4.2 V, namely: the voltage at the output port of the chip U1202 is 4.2 V.

The power supply unit for mobile terminals provided by the present invention is shown in FIG. 2. The power supply switching module 130 comprises a second resistor R30, a third resistor R15 and a field effect transistor Q202. The second resistor R30 and third resistor R15 are connected in series to form a second voltage sampling circuit 191. One end of the third resistor is connected with the power supply conversion module 110, a voltage dividing point of the second voltage sampling circuit 191 is connected with the gate of the field effect transistor Q202, the source of the field effect transistor is connected with the battery, and the drain of the field effect transistor is grounded.

In the present embodiment, the field effect transistor Q202 is a P-channel field effect transistor having a model number PDN304P, and the VGS switching threshold of the field effect transistor is above −0.8 V. The field effect transistor Q202 mainly functions as a switch in the present embodiment. When no external power supply is connected to the mobile terminal, the output of the power supply conversion module is at a low level, the field effect transistor is in an on state, and at this time, the mobile terminal is powered by the battery; when an external power supply is connected to the mobile terminal, the output of the power supply conversion module is at a high level, the field effect transistor is in an off state, and at this time, the mobile terminal is powered by the external power supply.

At the instant when the external power supply is cut off, in order for the power supply switching module 130 to smoothly switch the power supply mode for the power supply unit for mobile terminals, the sum of resistance of the second resistor and third resistor is 1.2 KΩ~1.5 KΩ, so as to ensure that when the charger is pulled out, capacitors in the network and gate capacitors of Q202 can quickly discharge against the ground. In the present embodiment, the resistance of said second resistor R15 is 1.2 KΩ and the resistance of the third resistor R30 is 200Ω, such that while the power supply switching module 130 smoothly switches the power supply mode, it is ensured that a 3.6 V voltage can be allocated to the second resistor R15 (gate of Q202).

In order to solve the issue of insufficient power supply from the power supply unit for mobile terminals, as shown in FIG. 2, the power supply unit for mobile terminals further comprises a system power supply module. The system power supply module 140 is connected in parallel at the output port of the power supply conversion module 110 and used for charging and power storage during off time of radio frequency transmission of a mobile terminal and for discharging to the mobile terminal during radio frequency transmission of the mobile terminal.

The system power supply module 140 comprises a first capacitor C33 and a second capacitor C1555 connected in parallel. Positive terminals of the first capacitor C33 and second capacitor C1555 are connected with the output port of the power supply unit for mobile terminals, and negative terminals of the first capacitor C33 and second capacitor C1555 are grounded.

When the mobile terminal's radio frequency works in a time division mode, the transient peak current could rise sharply during transmission time slots, and at this time, the power supply conversion module may have insufficient power supply, and the first capacitor C33 and second capacitor C1555 can immediately discharge and supplement the power supply for the terminal; during off time of radio frequency transmission, the first capacitor and second capacitor will be instantly charged and prepared for power supply during the next transmission slot.

In the present embodiment, the first capacitor C33 and second capacitor C1555 are both tantalum capacitors, since tantalum capacitors have advantages such as small volume, large capacity, low drain current, and long service life. It should be noted that the present invention could also use other capacitors capable of charging and discharging, for example, ceramic capacitors or electrolytic capacitors.

The circuit of the charging management module 120 is shown in FIG. 2. The circuit includes a chip U56 and a third filter circuit 180. The model of the chip U56 is S13441DV-T1, which functions as a switch in the present embodiment for controlling a battery charging signal. The third filter circuit 180 is used to filter electromagnetic interference from the battery power supply network and to ensure stability of the battery power supply system.

The negative terminal of the battery 150 is connected with a fifth resistor VR6 in series and then grounded. The positive terminal of the battery is connected with the third filter circuit 180, and then with the signal output ports of pins 1, 2, 5, and 6 of the chip U56. A sixth resistor R655 is further connected between the third filter circuit 180 and the chip U56 in series, and pin 3 of the chip U56 is connected with a seventh resistor R656 in series and then with the input port of the power supply via a second diode D15.

When a 5V external power supply is connected into a mobile terminal, the Current is rectified via the second diode D15, when the chip U56 receives a charging signal, it is set to an on state such that the 5V power supply charges the battery via the chip U56, and when the battery is fully charged, the chip U56 is turned off.

In the present embodiment, the third filter circuit 180 is a circuit comprising a plurality of capacitors and an eighth resistor VR50 connected in parallel, wherein the number of capacitors connected in parallel can be 4.

To better understand the present invention, the working principle of the present invention is described in detail below with a TD/GSM dual-mode cell phone as an example.

As shown in FIG. 2, when no external power supply (5V power supply input from a charger or a USB) is connected to the terminal, the power supply conversion module 110 does not work. Therefore, the voltage output from the power supply conversion module 110 is at a low level, the gate G of the P-channel field effect transistor Q202 is low level, and the field effect transistor Q202 is open. At this time, the battery 150 supplies power to the terminal system via Q202.

When a 5V external power supply (5V power supply input from a charger or a USB) is connected to the mobile terminal, the power supply conversion module begins to work. Chip U1202 inside the power supply conversion module converts the 5V voltage to 4.2V and supplies power to the terminal via the output port. At the same time, the voltage of the power supply switching module is 4.2V, and through a voltage sampling process by the second resistor R30 and the third resistor R15, the power supply allocated to the gate G of the effect transistor Q202 is 3.6V, the voltage makes sure that the mobile terminal will not open the field effect transistor Q202 in a voltage range of 3.3V~4.2V. As a result, the battery stops the power supply to the terminal, but the circuit portion of the charging management module 120 is still in a working state. Specifically, when an external power supply is connected into a mobile terminal, the chip U56 is set to an on state such that the 5V power supply charges the battery, and when the battery is fully charged, the chip U56 is turned off automatically, the charging management module stops working, and the terminal is still powered by the external power supply. However, the supply current of the power supply conversion module 110 is typically smaller than 1 ampere (A). While a TD/GSM dual-mode cell phone's radio frequency works in a time division mode, the transient peak current during transmission could reach 2 A or higher. Therefore, the power supply conversion module may have insufficient power supply. At this time, tantalum capacitors of the system power supply module discharge and rectify for the terminal, during off time of radio frequency transmission, the tantalum capacitors will be instantly charged and prepared for power supply during the next transmission slot. In this way, the requirement can be satisfied that when an external power supply is connected, the external power supply charges the terminal, and the battery is only charged without supplying power to the terminal, which is also suitable for charging switch for 3G handsets.

In the case where the terminal is powered by an external power supply and the battery is only charged without supplying power to the terminal, if the external power supply is cut off at this moment, the power supply conversion module 110 will instantly stop working. If the field effect transistor Q202 cannot be opened promptly at this time, the battery will not be able to immediately supply power to the system power supply module, resulting in power cutoff to the terminal. Therefore, the present invention employs a sum of resistance of the second resistor R30 and third resistor R15 of 1.2 KΩ~1.5 KΩ such that the capacitor energy storage in the second filter circuit 170 of the power supply conversion module and the gate G junction capacitor energy storage of the field effect transistor Q202 can quickly discharge against the ground when the external power supply is cut off. As a result, the gate G voltage of the field effect transistor Q202 drops quickly to reach a state that Q202 is re-open, such that the battery quickly begins to supply power to the system power supply module. When the charger is pulled out, a smooth switching can be realized in which the battery quickly restores power supply to the terminal system and the terminal still works normally.

Figure 3:
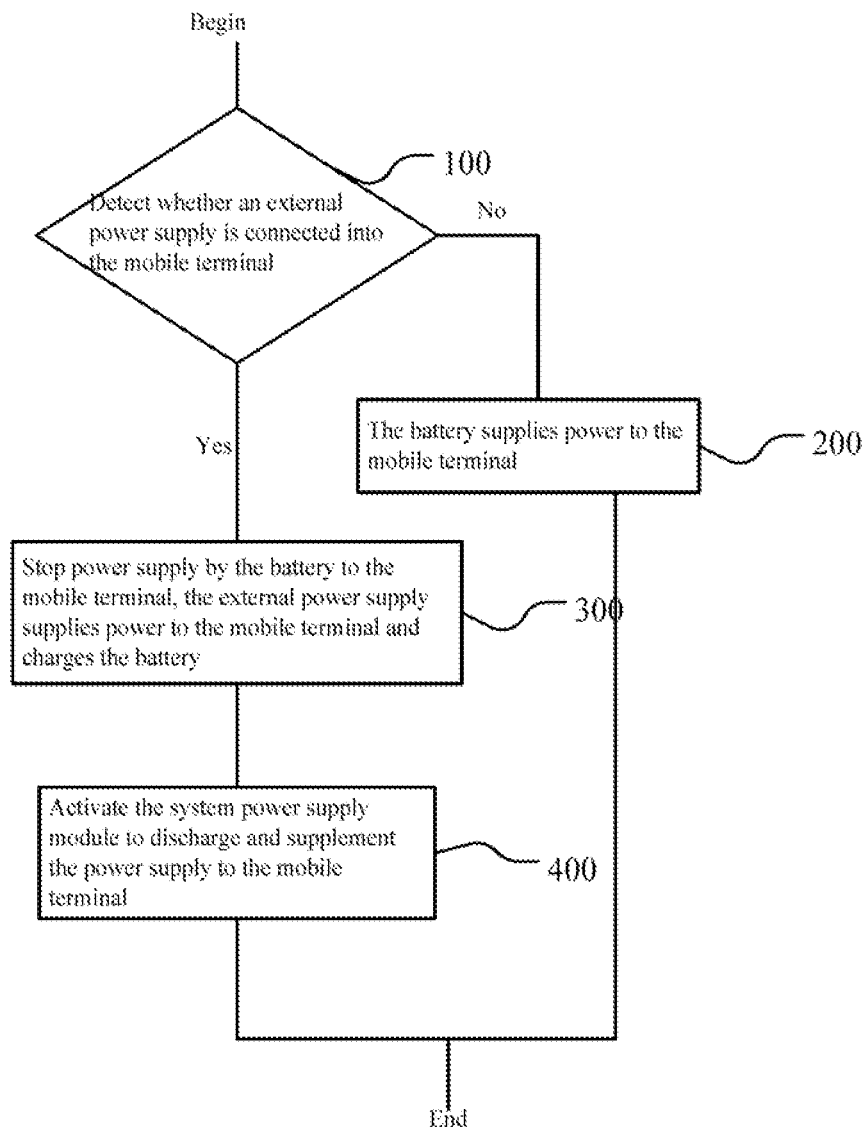
FIG. 3 is a flow chart of a power supply switching method for mobile terminals according to the present invention.

The present invention provides a corresponding power supply switching method for mobile terminals by means of the power supply unit for mobile terminals, as shown in FIG. 3, comprising the following steps of:

Step 100. The power supply conversion module detects whether an external power supply is connected into the mobile terminal; if yes, go to Step 300, otherwise, go to Step 200;

Step 200. Activate the battery to supply power to the mobile terminal;

Step 300. When an external power supply is connected into the mobile terminal, stop the power supply by the battery to the mobile terminal, the power supply conversion module converts the power supply mode, activates the external power supply to supply power to the mobile terminal and charges the battery; and Step 400. When the current of the power supply by the external power supply is not sufficient, activate the system power supply module to discharge and supplement the power supply to the mobile terminal.

According to the above method, the present invention provides a power supply unit for mobile terminals, which employs a power supply conversion module to convert the voltage of an external power supply into a power supply voltage required by the terminal, and a power supply switching module to switch the power supply mode between the battery and the power supply conversion module. It realizes that when the terminal is connected with an external power supply, the external power supply supplies power to the terminal and the battery is only charged without supplying power to the terminal, which meets the requirement in the "Chinese Standards for Mobile TD Family Cell Phones" and is suitable for power supply switching of 3G handsets.

It should be understood that to those skilled in the art, equivalent substitutions or modifications can be made according to the technology and invention concept of the present invention, and all these substitutions or modifications shall be encompassed in the scope defined by claims of the present invention.

The invention claimed is:

1. A power supply unit for mobile terminals, comprising:
a power supply conversion module;
a charging management module; and
a power supply switching module,
wherein said charging management module and power supply switching module each comprise a power supply input port used for connection with an external power supply;
wherein said charging management module is connected with a battery and used for charging the battery when the external power supply is connected,
wherein said power supply conversion module is connected with said power supply switching module and used for converting a voltage of an external power supply into power supply voltage required by a mobile terminal and controlling an on-off state of said power supply switching module,
wherein the power supply switching module is in an on state when no external power supply is connected and the battery supplies power to the mobile terminal, and
wherein said power supply switching module is off and said power supply conversion module outputs the power supply voltage when the external power supply is connected,
wherein said power supply switching module comprises a second resistor, a third resistor and a field effect transistor,
wherein said second resistor and third resistor are connected in series to form a voltage sampling circuit, one end of said third resistor is connected with said power supply conversion module, a voltage dividing point of said voltage sampling circuit is connected with a gate of said field effect transistor, and a source of said field effect transistor is connected with said battery.

2. The power supply unit for mobile terminals as set forth in claim 1, further comprising a system power supply module, said system power supply module being connected in parallel at an output of said power supply conversion module and used for charging and power storage during off time of radio frequency transmission of the mobile terminal and for discharging during radio frequency transmission of the mobile terminal.

3. The power supply unit for mobile terminals as set forth in claim 2, wherein said system power supply module comprises a first capacitor and a second capacitor connected in parallel.

4. The power supply unit for mobile terminals as set forth in claim 3, wherein said first capacitor and second capacitor are both tantalum capacitors.

5. The power supply unit for mobile terminals as set forth in claim 1, wherein said power supply conversion module comprises an integrated chip with model number POWER-DC20C-TPS62040DRC used for converting the voltage of an external power supply into a power supply voltage required by the mobile terminal.

6. The power supply unit for mobile terminals as set forth in claim 1, wherein a sum of resistance of said second resistor and third resistor is 1.2 KΩ~1.5 KΩ.

7. A power supply switching method comprising:
detecting whether a mobile terminal is in a first mode of operation, wherein an external power supply is connected to the mobile terminal;

detecting whether the mobile terminal is in a second mode of operation, wherein the external power supply is not connected to the mobile terminal;

supplying power to the mobile terminal with a battery when the mobile terminal is in the second mode of operation; and supplying power to the mobile terminal and charging the battery with the external power supply when the mobile terminal is in the first mode of operation, wherein, in the first mode of operation, the battery does not supply power to the mobile terminal, wherein a power supply switching module comprises a second resistor, a third resistor and a field effect transistor, wherein said second resistor and third resistor are connected in series to form a voltage sampling circuit, wherein one end of said third resistor is connected with a power supply conversion module, and wherein a voltage dividing point of said voltage sampling circuit is connected with a gate of said field effect transistor; and wherein a source of said field effect transistor is connected with said battery.

8. The method as set forth in claim 7, further comprising activating a system power supply module to discharge and supplement the external power supply to the mobile terminal when the mobile terminal is in a first mode of operation.

9. The method as set forth in claim 7, further comprising converting a voltage of the external power supply into a power supply voltage required by the mobile terminal.

10. The method as set forth in claim 7, wherein a sum of resistance of said second resistor and third resistor is 1.2 KΩ~1.5 KΩ.

11. A mobile terminal comprising:
a battery;
a power supply input port for connecting an external power supply;
a power supply conversion module adapted to receive power via the power supply input port;
a charging management module adapted to receive power via the power supply input port; and
a power supply switching module,
wherein said charging management module is connected with the battery and is used for charging the battery when the external power supply is connected to the power supply input port; and said power supply conversion module is connected with said power supply switching module and is used for converting a voltage of the external power supply into power supply voltage required by the mobile terminal and for controlling an on-off state of said power supply switching module, wherein the power supply switching module is in an on state when no external power supply is connected and the battery supplies power to the mobile terminal, and wherein said power supply switching module is off and said power supply conversion module outputs the power supply voltage when the external power supply is connected, wherein said power supply switching module comprises a second resistor, a third resistor and a field effect transistor, wherein said second resistor and third resistor are connected in series to form a voltage sampling circuit, with one end of said third resistor connected with said power supply conversion module, and wherein a voltage dividing point of said voltage sampling circuit is connected with a gate of said field effect transistor, and a source of said field effect transistor is connected with said battery.

12. The mobile terminal as set forth in claim 11, further comprising a system power supply module, said system power supply module being connected in parallel at an output of said power supply conversion module and used for charging and power storage during off time of radio frequency transmission of the mobile terminal and for discharging during radio frequency transmission of the mobile terminal.

13. The mobile terminal as set forth in claim 12, wherein said system power supply module comprises a first capacitor and a second capacitor connected in parallel.

14. The mobile terminal as set forth in claim 13, wherein said first capacitor and second capacitor are both tantalum capacitors.

15. The mobile terminal as set forth in claim 11, wherein said power supply conversion module comprises an integrated chip with model number POWER-DC20C-TPS62040DRC used for converting the voltage of an external power supply into a power supply voltage required by a mobile terminal.

16. The mobile terminal as set forth in claim 11, wherein a sum of resistance of said second resistor and third resistor is 1.2 KΩ~1.5 KΩ.

* * * * *